April 11, 1944. H. C. SCHAPER 2,346,510
POWER TRANSMISSION BELT
Filed March 31, 1942
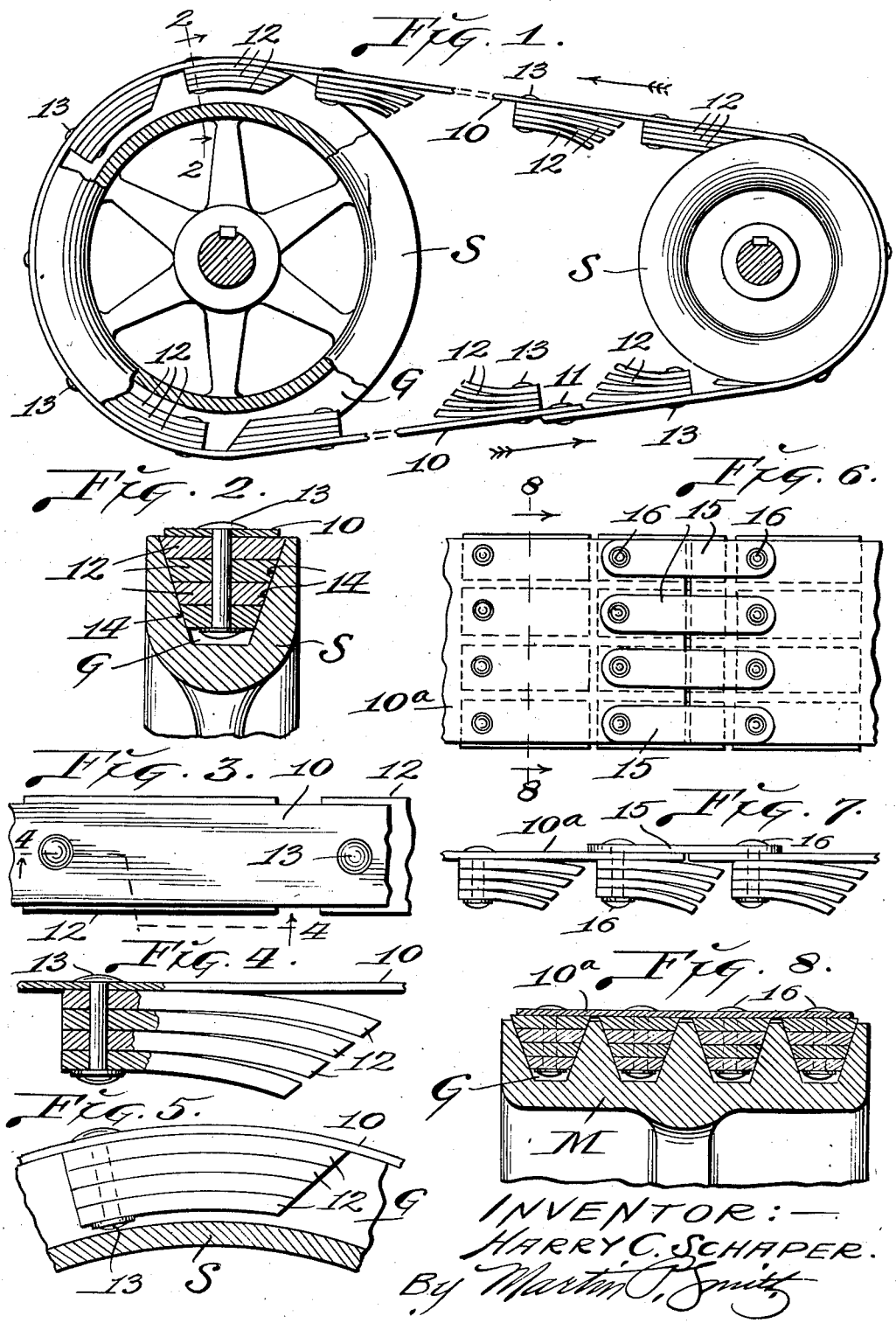
INVENTOR:—
HARRY C. SCHAPER.
By Martin P. Smith Patented Apr. 11, 1944

2,346,510

UNITED STATES PATENT OFFICE 2,346,510

POWER TRANSMISSION BELT

Harry C. Schaper, Buffalo, N. Y.

Application March 31, 1942, Serial No. 436,980

8 Claims. (Cl. 74—233)

My invention relates to power transmission belts generally known as V-belts.

The accepted and conventional types of V-belts of present day constructon are made by a process of molding rubber or other flexible substance or compound in which cords or fabric plies are embedded in order to increase the tensile strength of the belt. Such belts are ordinarily made endless in various pre-determined lengths, each length requiring a separate mold, which procedure results in high costs of manufacture. Because of the materials used and the method of manufacture, belts produced from the same mold often have a variance in length and thus for multiple drive belts extreme care must be exercised in selecting belts of identical lengths so as to provide uniform loading of the individual belt members for the particular work for which they are designed.

The tendency of belts of this construction to stretch is generally known and if not taken up, slippage is caused with resultant loss in transmission power, such stretching being further accelerated by internal frictional heat set up by the constant relative movement between compression and tension forces caused by the differential diameters of the belt when operating around a pulley or sheave and which frictional heat eventually breaks down the structure of the belt and renders the same unfit for service. Furthermore, when slippage occurs the angular working surfaces of such molded belts become glazed, thereby reducing the coefficient of friction with a proportionate loss of transmitted power.

To obtain a higher coefficient of friction, several types of V-belts are manufactured in which leather is used, one type having a solid continuous V section. Another type has a series of spaced solid cog sections formed integral with or fixed to a continuous band located on the upper surfaces of the cogs.

It is obvious that in the solid continuous type, flexibility is reduced to a point where exceedingly large diameter sheaves are required to assure satisfactory contact of belt with the grooves in the sheave so that aside from the gain in coefficient of friction, the cost of the large sheaves prohibits the general use of belts of this type.

The spaced sectional type of leather belt provides greater flexibility, thereby permitting the use of smaller diameter sheaves, but the application of leather as described has a characteristic tendency to contract and expand under varying climatic and temperature conditions, thereby causing variable tension in the belt with a resultant loss of power when expanded and excessive bearing pressure when contracted.

Because of the aforesaid disadvantages attending the construction and use of leather composed belts, although admittedly of a higher coefficient of friction, such belts have not been generally accepted by power users.

The principal object of my invention is, to generally improve upon and simplify the construction of the existing forms of V-belts and to provide a simple, practical construction which may be manufactured with economic advantage and which eliminates the disadvantages herein pointed out in connection with V-belts as now manufactured and used.

A further object of my invention is, to provide a fabricated V-belt, the working surfaces of which may be made of a readily obtainable, inexpensive material such as scrap leather.

A further object of my invention is, to provide a V-belt that includes a non-stretching, length determining, power transmitting member, which enables an accurate pre-determined length of V-belt to be produced.

Further objects of my invention are, to provide a V-belt structure including a plurality of sets of friction elements adapted to engage in the grooves of a multiple groove sheave, thus providing a multiple V-belt which functions in the transmission of power as a single belt, further, to provide a V-belt in which a maximum of coefficient of friction is combined with a minimum of internal frictional heat development, and further, to provide a belt of the character referred to which may be manufactured in roll lengths and be readily reduced to usable lengths as required and such belt capable of being easily assembled and installed.

With the foregoing and other objects in view, my invention consists in certain novel features of construction and arrangement of parts that will be hereinafter more fully described and claimed and illustrated in the accompanying drawing in which:

Fig. 1 is a side elevational view of a V-belt constructed in accordance with my invention, the same being shown in operative position on a pair of sheaves and with parts of one sheave broken away and in section.

Fig. 2 is an enlarged cross sectional view taken on the line 2—2 of Fig. 1.

Fig. 3 is a fragmentary plan view showing a portion of the endless power transmitting member with friction elements attached thereto.

Fig. 4 is an elevational sectional view taken on the line 4—4 of Fig. 3.

Fig. 5 is an elevational view with parts in section and showing the laminated friction elements in the positions occupied while in the groove of a sheave.

Fig. 6 is a plan view of a portion of a belt constructed in accordance with my invention and which includes a plurality of sets of friction elements arranged on the endless member so as to provide a multiple V-belt.

Fig. 7 is a side elevational view of the multiple V-belt and showing the connection between the ends of the endless power transmitting element.

Fig. 8 is an enlarged cross section taken on the line 8—8 of Fig. 6 and showing a portion of the sheave that carries the multiple V-belt.

Referring by numerals to the accompanying drawing which illustrates a preferred embodiment of my invention, 10 designates the power transmitting member which is preferably constructed from a single piece of thin, flexible metal such as steel of high tensile strength and the ends thereof being permanently connected in any suitable manner, preferably by rivets 11.

Mounted on the inner face of member 10 is a row of laminated friction elements which are spaced apart lengthwise of said member with the layers or laminations 12 disposed longitudinally of member 10 and secured to the latter at one end by suitable means, preferably a rivet or rivets 13. These laminations 12 are preferably formed of flexible material such as leather, rubber, rubber composition, or rubber impregnated fabric, and as each set of laminations is secured to member 10 at one end only, in cantilever fashion, the greater portions of the bodies of the laminations are free to flex toward and away from member 10 as the belt passes around and between the sheaves upon which it is mounted.

Thus the laminations of the friction elements are free to assume various curvatures so as to conform with the different diameters of the grooves G in the sheaves S upon which the belt operates.

The width of the individual laminations 12 gradually decreases away from the member 10 and the sides of said elements are provided with correspondingly inclined faces 14 so as to conform to the angularity of the sides of the grooves in the sheaves and said angular faces providing the frictional surfaces of the belt.

Thus frictional contact is provided by the edge surfaces of the laminations and it is well known that the coefficient of friction is greater on the edge surfaces than on the flat surfaces of leather and thus a belt of my improved construction provides a maximum of coefficient of friction.

The pressure contact of the laminated friction elements when engaged with the surfaces of the grooves in the sheaves S causes the free ends of the laminations to be flexed into distorted circular lines after breaking contact with the groove in the sheave as illustrated in Figs. 1 and 4, thus causing the free ends of the laminations to separate when traveling between the sheaves and which separation results in an effective dissipation of internal frictional heat.

In power transmission drives now in general use and which include multiple groove sheaves and V-belts, a number of individual belts are used. When one or more of the belts break as a result of unequal tension, it is necessary to replace the entire set of belts for the reason that continual use of belts causes the same to stretch and thus a new belt would not match those belts remaining in the old structure.

In Figs. 6, 7, and 8, I have illustrated a multiple V-belt which comprises a single power transmitting member 10a similar to member 10, but obviously wider, and which carries on its inner face a plurality of longitudinally disposed parallel rows of laminated friction elements, said rows being spaced laterally so as to engage the grooves G in a multiple sheave M, thus providing ample frictional contact in multiple form but acting as a single unit.

While I prefer to use flat, resilient metal, preferably steel, for the power transmitting member when used as a single belt, it may be desirable in the construction of a multiple belt to use a flat belt having great flexibility combined with high tensile strength for the reason that the power transmitting member when used in connection with multiple drives has width sufficient to furnish the necessary power without sacrificing flexibility.

In the multiple type belt illustrated in Figs. 6, 7, and 8, the ends of the member 10a are united by resilient plates 15 that are applied to the outer face of the member 10a and arranged so as to bridge the joint between the ends and said plates being secured to member 10a by the same rivets 16 that are used in attaching the laminated friction elements to the power transmitting member adjacent the joint therein.

I prefer to construct the power transmitting elements 10 and 10a slightly narrower in width than the width of the laminated friction producing elements in both the single and multiple construction as illustrated in Figs. 2, 6, and 8, thus eliminating any frictional contact between the side edges of the power transmitting member and the flanges of the sheaves.

It is to be noted that in my improved belt, the groups of laminated friction elements are spaced apart longitudinally of the continuous member 10, and as the laminations forming said elements are connected to each other and to said member at one end only, all of the laminations of each group are free to flex independently during travel and particularly while passing onto and from the sheaves.

Thus it will be seen that I have provided a power transmission belt that is relatively simple in construction, inexpensive of manufacture and very effective in performing the functions for which it is intended.

It will be understood that minor changes in the size, form and construction of the various parts of my improved power transmission belt, may be made and substituted for those herein shown and described, without departing from the spirit of my invention, the scope of which is set forth in the appended claims.

I claim as my invention:

1. In a V-belt, a continuous flexible power transmitting member and a plurality of laminated friction elements secured at one end only to the inner face of said power transmitting member and spaced apart longitudinally thereof.

2. In a V-belt, a continuous flexible power transmitting member, a plurality of longitudinally disposed laminated friction elements secured at one end only to the inner face of said power transmitting member and spaced apart longitudinally thereof and which laminated friction elements are provided with inclined side faces.

3. In a V-belt, a continuous flexible power transmitting member, a plurality of longitudinally disposed laminated friction elements carried by the inner face of said power transmitting member and spaced apart longitudinally thereof and each set of laminated friction elements being secured to the power transmitting member at one end in cantilever form.

4. In a power transmission belt for sheaves having a plurality of spaced grooves, a continuous flexible power transmitting member and a plurality of laminated friction elements secured to the inner face of said power transmitting member and spaced laterally and longitudinally thereof so as to engage in the grooves of said sheaves said power transmitting member having no frictional contact with said sheaves and being connected to said flexible member at one end only.

5. In a power transmission belt for sheaves having a plurality of spaced grooves, a continuous flexible power transmitting member, a plurality of laminated friction elements secured to the inner face of said power transmitting member and spaced laterally and longitudinally thereof so as to engage in the grooves of said sheaves and each laminated friction element being secured to said power transmitting member at one end in cantilever form said power transmitting member having no frictional contact with said sheaves.

6. In a power transmission belt for sheaves having a plurality of spaced grooves, a continuous flexible power transmitting member, a plurality of laminated friction elements secured at one end only to the inner face of said power transmitting member and spaced laterally and longitudinally thereof so as to engage in the grooves of said sheaves and the laminations of which frictional elements are flexible said power transmitting member having no frictional contact with said sheaves.

7. In a V-belt the combination with a continuous flexible power transmitting member, of a series of longitudinally disposed flexible laminated friction elements secured at one end only on the inner face of said power transmitting member and spaced apart longitudinally thereof.

8. In a V-belt the combination with a continuous flexible power transmitting member, of a series of flexible laminated friction elements arranged on the inner face of said power transmitting member and spaced apart longitudinally thereof and each laminated friction element being secured at one end only to said power transmitting member.

HARRY C. SCHAPER.